US006810260B1

(12) United States Patent
Morales

(10) Patent No.: US 6,810,260 B1
(45) Date of Patent: Oct. 26, 2004

(54) METHOD AND APPARATUS FOR AUTOMATED CALL-BACK SUBSCRIBER SERVICE

(75) Inventor: Omar Torres Morales, Saltillo (MX)

(73) Assignee: Telefonaktiebolaget LM Ericsson, Stockholm (SE)

( * ) Notice: Subject to any disclaimer, the term of this patent is extended or adjusted under 35 U.S.C. 154(b) by 509 days.

(21) Appl. No.: 09/717,947

(22) Filed: Nov. 21, 2000

(51) Int. Cl.[7] .................................................. H04M 1/00

(52) U.S. Cl. .................... 455/460; 455/567; 455/422.1; 455/564

(58) Field of Search ................................. 455/416, 417, 455/462, 555, 422.1, 460, 564, 567, 466; 379/210.01, 46

(56) References Cited

U.S. PATENT DOCUMENTS 5,406,616 A * 4/1995 Bjorndahl ................... 455/433
5,627,875 A * 5/1997 Kapsales
5,712,900 A 1/1998 Maupin et al. ............... 379/59
5,995,848 A 11/1999 Nguyen ...................... 455/528
6,360,109 B1 * 3/2002 Thauvin et al.
6,535,730 B1 * 3/2003 Chow et al.

FOREIGN PATENT DOCUMENTS

WO WO200007349 1/2000

* cited by examiner

*Primary Examiner*—Erika Gary
*Assistant Examiner*—Huy Nguyen

(57) ABSTRACT

A method of implementing a call-back service by a calling party subscriber attempting to call a telecommunications device operated by a called party, comprising the steps of paging to the telecommunications device, determining that the device is not available, and noting in a calling party subscriber record that a subsequent call is to be placed to the device upon its subsequent registration. The method may include the steps of receiving an indication that the device is available and placing the subsequent call to the device. The method may also includes the steps of notifying the subscriber that the device is available and querying the subscriber as to whether the subsequent call should be placed to the device.

A system for implementing a call-back service by a calling party subscriber attempting to call a called party telecommunications device comprises a node for paging the called party telecommunications device, determining that the called party telecommunications device is not available, and noting in a calling party subscriber record to place a subsequent call to the called party telecommunications device upon its subsequent registration. The system may include a calling party telecommunications device for receiving an indication that the called party telecommunications device is unavailable and for placing a call-back to the called party telecommunications device after registration occurs.

19 Claims, 7 Drawing Sheets

| No. | STATUS | LOC | REF | CHANGE ON: | ACTION |
|---|---|---|---|---|---|
| B | reg | msc2 | A | status noreg ->reg | CB |

| No. | STATUS | LOC | REF | CHANGE ON: | ACTION |
|---|---|---|---|---|---|
| A | reg | msc1 | B | NA | CB |

| No. | STATUS | LOC | REF | CHANGE ON: | ACTION |
|---|---|---|---|---|---|
| B | reg | msc2 | NA | NA | NA |
| A | reg | msc1 | NA | NA | NA |

METHOD AND APPARATUS FOR AUTOMATED CALL-BACK SUBSCRIBER SERVICE

BACKGROUND OF THE INVENTION

1. Technical Field

This invention relates generally to subscriber services for telecommunications devices. More particularly, the invention relates to a method and apparatus to call back a momentarily unavailable user of a telecommunications device in an automated fashion.

2. History of Related Art

A number of subscriber services are available to users of telecommunications devices, such as mobile cellular telephones, including ring-back or call-back services. Essentially, when a calling party attempts to call another party already engaged in conversation, these services allow the calling party to activate a call-back service whereby the called party is dialed upon termination of the pre-existing conversation. Such services are also known by the popular names of "Call Buster" or "Busy Buster." In any case, these services are quite convenient. They serve to relieve the calling party of continually dialing the number of the called party until after a busy signal is no longer received, and the calling party is free to complete the connection with the called party.

Currently available call-back services do not, however, account for the situation where the called party is not reachable, such as when not located in the local service area when the party is engaged in a call, or when the called party has turned off its phone. In these cases, the call-back service fails.

Thus, what is needed is a method and apparatus for implementing a call-back service by a subscriber attempting to call a telecommunications device operated by a called party when the called party is unavailable due to turning off the telecommunications device, engaging in a call, or roaming out of the service area so that the received and/or transmitted signals are too weak to be picked up by the local base station. Such a method and apparatus would be even more useful if it provided an announcement to the calling party when the called party subsequently became available, and offered the option of calling back the called party at that time, as previously ordered by the calling party.

SUMMARY OF THE INVENTION

The invention includes a method of implementing a call-back service by a calling party attempting to call a telecommunications device operated by a called party, comprising the steps of placing a call to the telecommunications device, receiving an indication that the device is not available (e.g., meant to include "not located", or "not found", or "busy"), and ordering a subsequent call to be placed to the device upon subsequent registration (i.e., when the device becomes available). In other words, if the device does not respond to a LOCATIONREQUEST message from the appropriate Home Location Register (HLR), then the method of the present invention may be fully employed.

The method may include the steps of receiving an indication that the device is available, and placing a subsequent call to the device. Further, the method may include the steps of notifying the calling party that the device is available, and querying the calling party as to whether the subsequent call should be placed.

Typically, the telecommunications device is associated with an A-number, and the original (non-completed) call is placed to the device by dialing the A-number. A subsequent call to the device may also be placed by dialing the A-number. Alternatively, the subsequent call may be made by simply entering a preselected feature code by the calling party, with the A-number being automatically dialed. An announcement that the device is turned off, busy, or out of range may constitute receiving an indication that the device is not available. Ordering a subsequent call to be placed to the device upon registration may include the step of entering a preselected feature code.

In an alternative embodiment, the method of the present invention may be employed in a situation where a second HLR, having a table with an HLR reference field, is associated with the telecommunications device. This reference field typically points to a first HLR associated with the subscriber. Thus, inter-HLR operations can be accommodated by the method of the present invention. To make use of the first and second HLRs, the method in this case includes the steps of notifying the first HLR that the device is registered, and notifying the subscriber that the device is available.

The invention also includes a node or network adapted to implement a call-back service by a calling party attempting to call a telecommunications device operated by a called party, comprising a node for placing a call to the telecommunications device, receiving an indication that the device is not available, and receiving an order to place a subsequent call (the "call-back") to the device upon registration.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
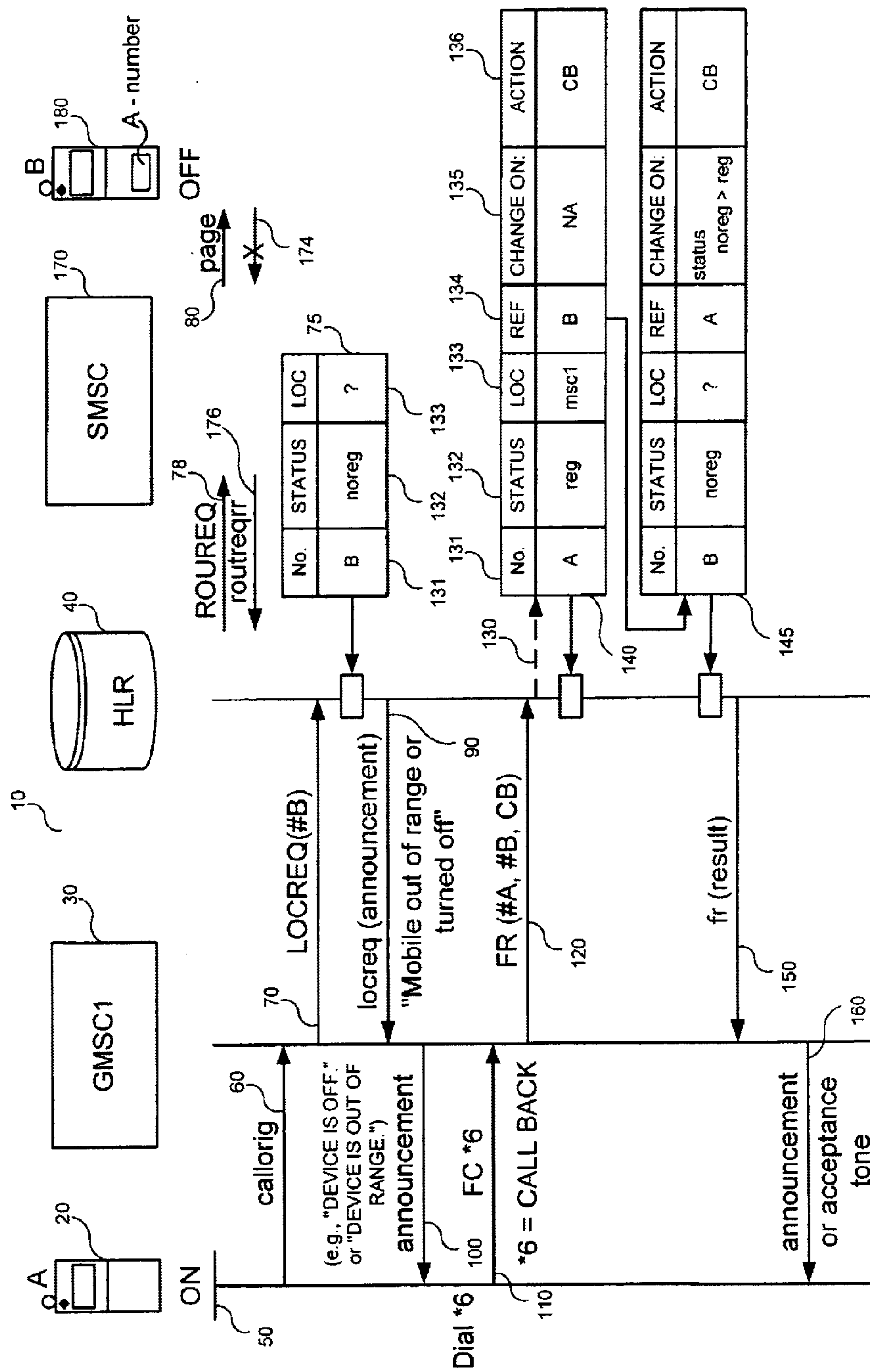
FIG. 1 is a network operational diagram illustrating the method of the present invention.

Turning now to FIG. 1, the fundamental steps of the method of the present invention can be seen. Here, a telecommunications network 10 is illustrated as comprising a telephone 20 (operated by a calling party A) in conjunction with a Gateway Mobile Switching Center (GMSC) 30 and an HLR 40. In this case, the subscriber operating the telephone 20 turns on the phone in step 50 and originates a call in step 60, typically by dialing the A-number of the called party B, associated with a telecommunications device 180. A LOCATIONREQUEST message is sent from the GMSC 30 to the HLR 40 in step 70, and, after the HLR 40 determines that the device 190 is inactive. This occurs in steps 78, 80, 174, and 176, wherein a ROUTINGREQUEST message is sent from the HLR 40 to the Serving MSC (SMSC) 170 (in step 78). At this point, the SMSC 170 may detect that the MS 180 is engaged in a call (i.e. unavailable), or the MS 180 may be paged (in step 80) by the SMSC 170. No response is received from the device 180 (which is not available) in step 174, and the appropriate return result response is received by the HLR 40 in step 176, due to the device 180 being out of range, busy, or turned off, for example.

Tables 75, 140, and 145 represent subscriber profile records associated with the device 180, typically stored in the HLR 40. The first field 131 represents the MS identification, and a value of "A" means the record is for the calling party A and a value of "B" means the record is for the called party B. The second field 132 represents the current status of the MS identified in field 131, and a value of "reg" means the MS is registered (i.e., available) while a value of "noreg" means the MS is not registered (i.e., not available, for example, out of range), and a value of "busy" means the MS 180 is busy (i.e., unavailable, for example, engaging in a call). The third field 133 represents the current location of the MS, and a value of "mscl" means that the MS is currently served by mscl while a value of "?" means that the location is unknown. The fourth field 134 represents a cross-reference to another subscriber record, in this case, to the called party B subscriber record. The fifth field 135 represents call-back event action timing, and a value of "NA" means no action is to be taken, while a value of status "noreg→reg" or "busy→reg" means that the action specified in field 136 should be taken when the status in field 132 changes from "noreg" or "busy" to "reg". The sixth field 136 represents the action to be taken upon occurrence of the event in field 135, and a value of "CB" means that the action will be a call-back, while a value of "NA" means no action is specified. Thus, the HLR 40 receives an indication that the device 180 is not available in the return result response 176, since the Status flag 132 in the HLR 40 table 75 indicates the condition of the device 180 as being "not registered."

Subsequently, the locationrequest response, usually in the form of an announcement, is sent towards the subscriber A in step 90 from the HLR 40 to the GMSC 30. The announcement is thereafter sent from the GMSC 30 to the subscriber telephone 20 in step 100 for receipt by the subscriber A, alerting the subscriber that the called party B device 180 is not available.

At this point, the subscriber A has the option of ordering a subsequent call (i.e., the "call-back") to be placed to the device 180 upon its subsequent registration. This can be accomplished by entering a preselected Feature Code, such as "*6". The feature code is sent from the telephone 20 to the GMSC 30 in step 110, and results in recording an order to place a subsequent call to the device 180 upon its registration. This occurs by sending a FEATUREREQUEST message, including the subscriber A telephone number, the called party B telephone number, and the request for call-back service to be performed upon registration of the device 180. The FEATUREREQUEST message is sent in step 120, and results in placing a call-back action order in the action flag 136 of the table 140 (which is the subscriber record for the calling party A). The condition of the status flag 132 is thereafter monitored so that the subscriber A is notified when the condition of the status flag 132 indicates that the device is registered. In this case, the A subscriber mobile table 140 is linked to the called party B subscriber table 145 by the reference field 134 and the action to be performed in the action field 136. Further, the mobile table 145 for the called party B is set to include the call-back action order when the status of the device 180 changes from "not registered" to "registered", or "busy" to "registered", as recorded in the event action timing field 135. This occurs in step 130. Successful activation of the call-back order is indicated by the response from the HLR 40 to the GMSC 30 in step 150, which is typically sent as an announcement, tone, or display message to the subscriber A in step 160, indicating that the call-back has been placed to the called party B.

Figure 2:
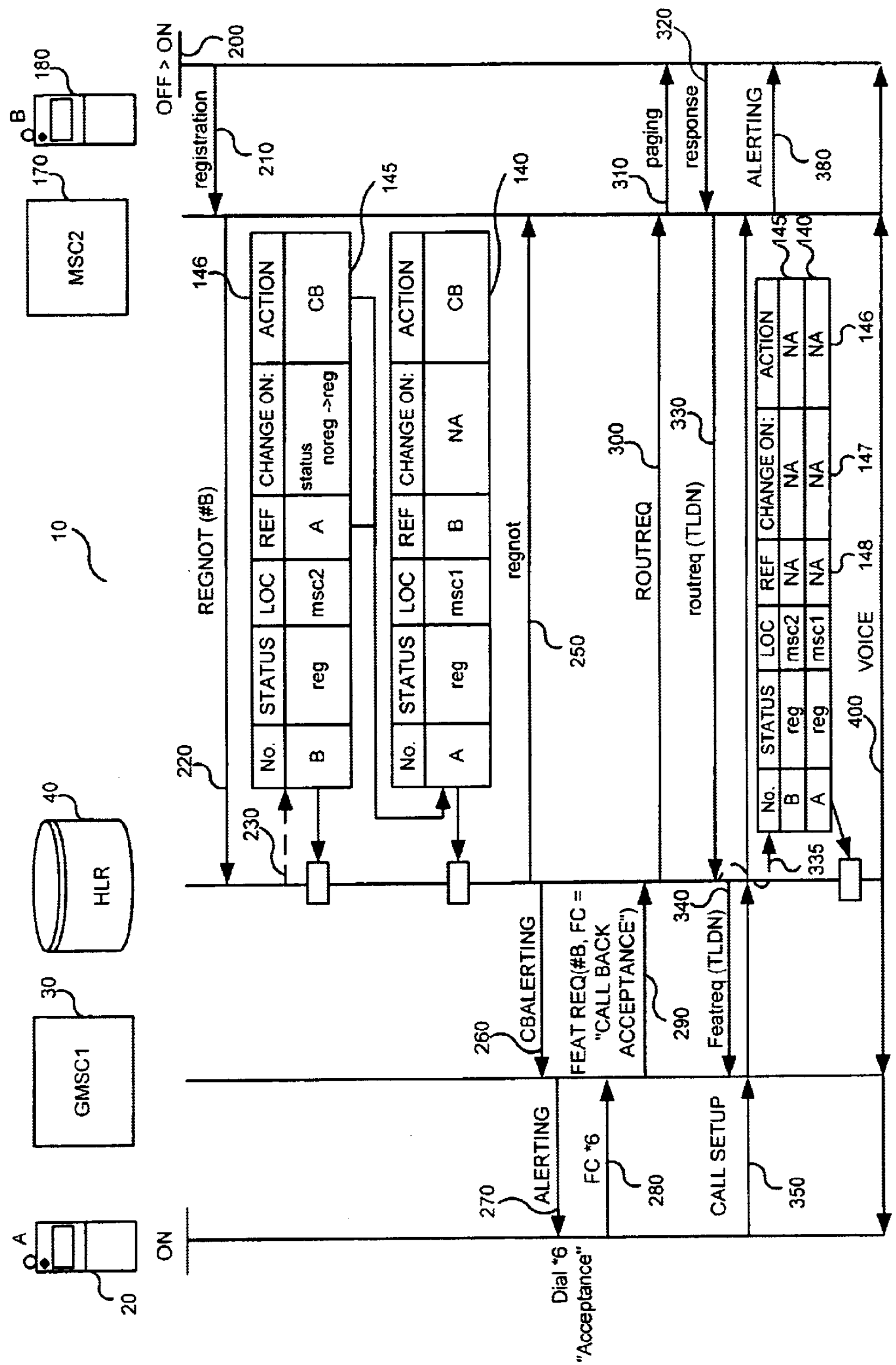
FIG. 2 is a network operational diagram illustrating the method of the present invention, including the step of placing a subsequent call to the device upon registration.

Turning now to FIG. 2, the method of the present invention, including placing a subsequent call to the called party device 180, can be seen. In this case, the device 180 is turned on at step 200, and registration occurs in step 210. A REGISTRATIONNOTIFICATION message is sent from the Mobile Switching Center (MSC) 170 associated with the device 180 to the HLR 40 in step 220. In this case, the HLR 40 updates the called party B mobile table 145 in step 230 and notes the condition of the action flag 146, which requires notification of the subscriber A upon registration (field 147). This initiates a call-back toward the referenced subscriber A (field 148), which results in alerting the subscriber A. A registration notification response is sent from the HLR 40 to the MSC 170 in step 250, and a call-back alerting message is sent from the HLR 40 to the GMSC 30 in step 260. The subscriber A is then alerted, or notified, that the called party B device 180 is available in step 270.

Call-back activity may occur automatically upon registration, or optionally, the subscriber A may be queried, using a query announcement or display message, as to whether the call-back should be made once registration occurs. This query message may be sent along with the alerting message in step 270. The subscriber A may elect to continue with call-back activity by dialing the A-number of the device 180 (which may have been sent along with the alerting message in step 270), or, alternatively, by simply selecting a feature code, for example, "#6" to initiate this activity in step 280. A FEATUREREQUEST message is then sent from the GMSC 30 to the HLR 40 in step 290, and a ROUTINGREQUEST message is subsequently sent from the HLR 40 to the MSC 170 in step 300, which initiates paging activity in step 310 from the MSC 170 to the device 180. Since the device 180 is now available, and registered, a device 180 response occurs in step 320, and a routingrequest response is returned from the MSC 170 to the HLR 40 in step 330. The call-back reference information and orders in fields 146–148 are cleared from the calling party A and called party B mobile tables 140, 145 in step 335. This, in turn, provides a featurerequest response, including the Temporary Local Directory Number (TLDN) for the device 180 from the HLR 40 to the GMSC 30 in step 340. After receiving the featurerequest response 340, the call connection can be set up in step 350 between the subscriber A telephone 20 and the device 180 operated by the called party B. The called party B is alerted to placement of the subsequent call in step 380. A voice path is then established between the respective telephonic communications devices 20, 180 in step 400.

Figure 3:
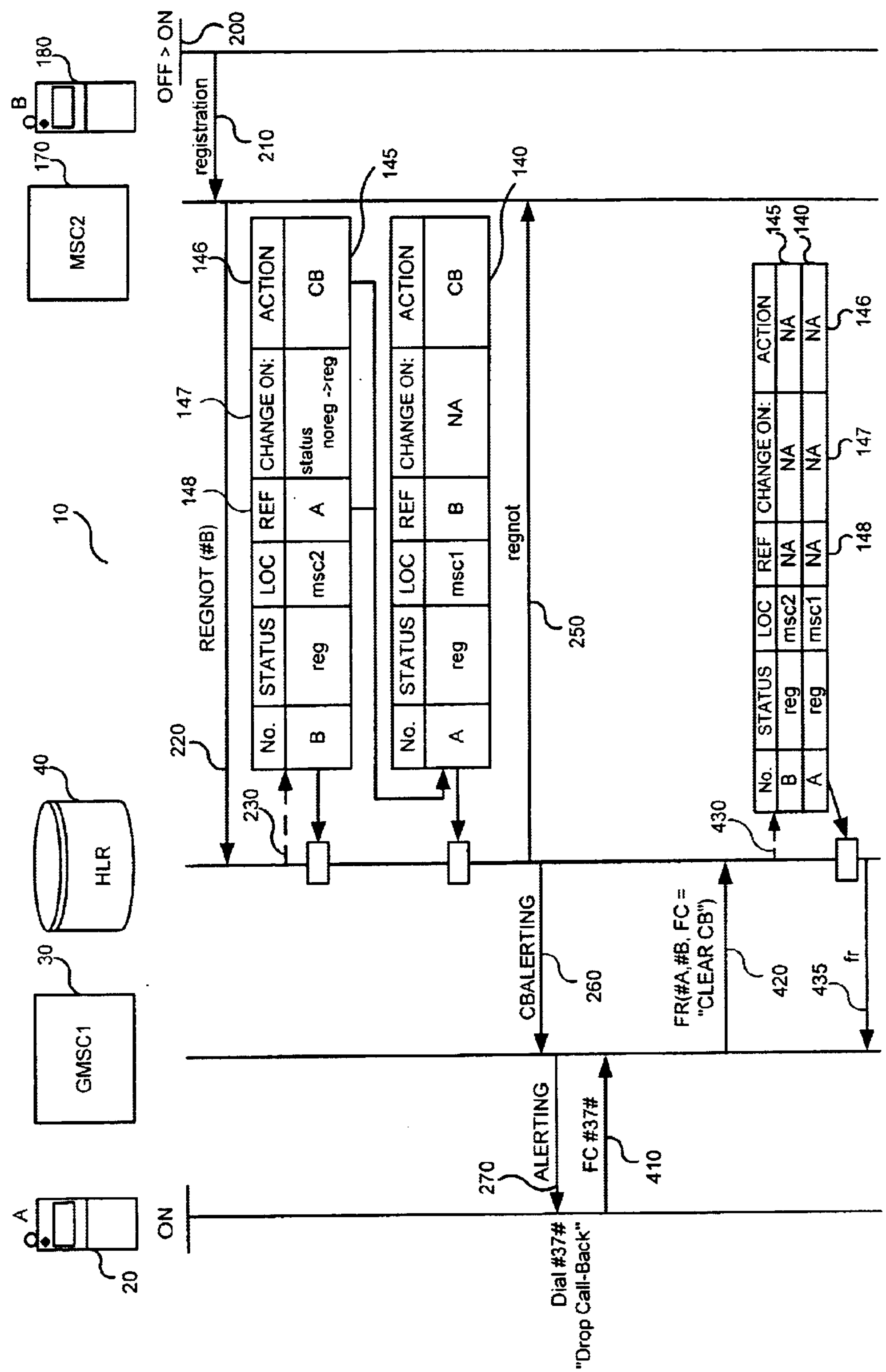
FIG. 3 is a network operational diagram illustrating the method of the present invention, including cancellation of an order to place a subsequent call to the telecommunications device.

Turning now to FIG. 3, it can be seen that the subscriber A may also have the option to drop or cancel the call-back order upon registration of the call party B device 180. Thus, after registration is completed in steps 210 and 220, the call-back order references are noted by the HLR 40 in step 230 (in fields 146–148), and the subscriber A is alerted to the availability of the device 180 via steps 260 and 270. At this point, the subscriber A may enter a preselected feature code, for example "#37 190", to drop the call-back order. The feature code request to cancel the call-back is forwarded from the subscriber A telecommunications device 20 to the GMSC 30 in step 410, and a FEATUREREQUEST message is sent from the GMSC 30 to the HLR 40 in step 420. This results in canceling the order by clearing the cross-references in fields 146–148 from the tables 140, 145 in step 430 after a featurerequest response is sent from the HLR 40 to the GMSC 30 in step 435.

Figure 4:
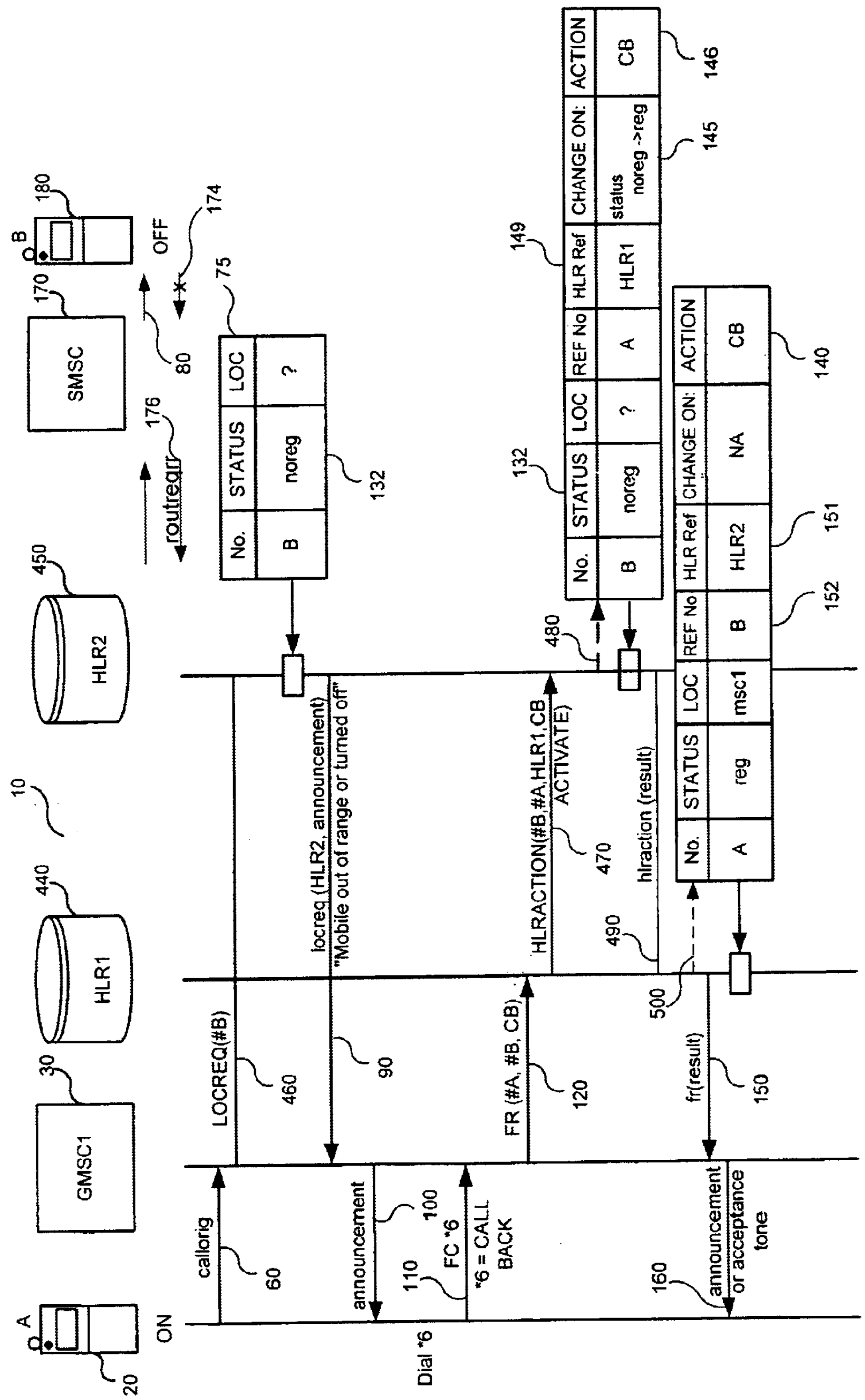
FIG. 4 is a network operational diagram illustrating the method of the present invention as implemented between HLRs.

On some occasions, it may be that the device 180 is not within the same service area as the HLR associated with the subscriber attempting to contact the called party. As shown in FIG. 4, the subscriber A device 20 is associated with a first HLR 440 and the device 180 is associated with a second HLR 450, and the method of the present invention is presented in an alternative embodiment. In this case, after call origination from the subscriber A to the called party B occurs in step 60, and a LOCATIONREQUEST message goes out from the GMSC 30 to the second HLR 450, in step 460, the HLR 450 notes that the status flag 132 for the device 180 indicates that the device 180 is not available, since it is not registered, in step 80. A message, in the form of an announcement, tone, or display message is sent from the second HLR 450 to the GMSC 30 in step 90, providing an indication that the device is not available to the subscriber A in step 100.

In this situation, the call-back order is placed by the subscriber A in the usual manner in step 110, that is, by entering a preselected Feature Code. The FEATUREREQUEST message is sent from the GMSC 30 to the first HLR 440 in step 120, and an HLRACTION message is sent from the first HLR 440 to the second HLR 450 in step 470. The HLRACTION message includes the telephone numbers of the subscriber A, the called party B (associated with the device 180), a reference to the first HLR 440, and a request to activate the call-back service. Thus, in step 480, the mobile table 145 for the called party B is updated as described previously, including a new field 149 (the "HLR reference field") referring to the first HLR 440. In this case, the action flag 146 is set to require notification of the first HLR 440 by the second HLR 450 when the condition of the status flag 132 indicates that the device 180 is "registered." This update occurs in step 480. A response to the HLRACTION message is then sent back from the second HLR 450 to the first HLR 440 in step 490, and this results in updating the mobile table 140 for the subscriber A by inserting a reference to the second HLR 450 in field 151, along with a reference in field 152 to the called party B device 180 in step 500. The response to the FEATUREREQUEST message is sent from the first HLR 440 to the GMSC 30 in step 150, and confirmation of the call-back order placement is sent from the GMSC 30 to the subscriber A device 20 in step 160.

Figure 5:
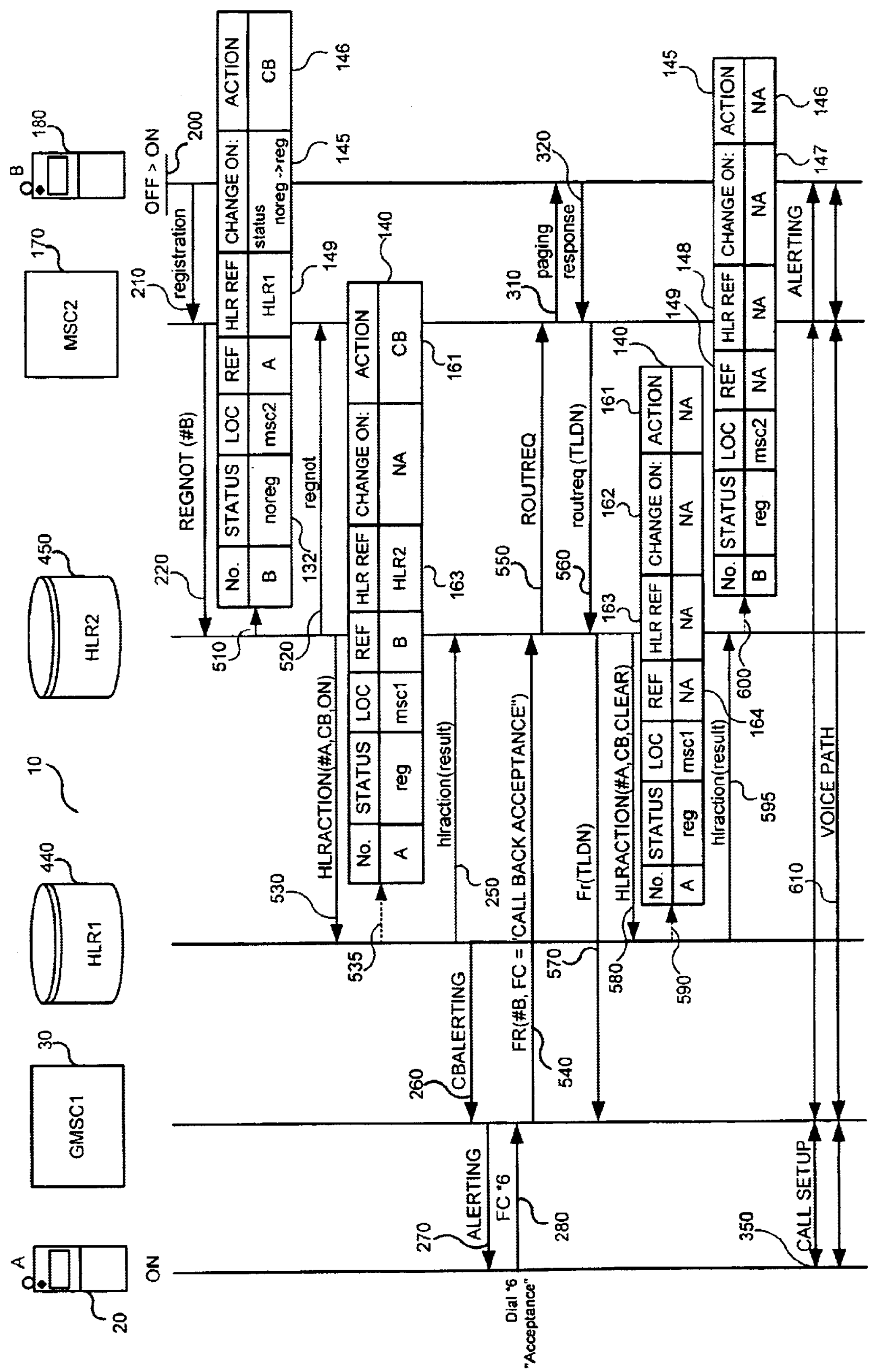
FIG. 5 is a network operational diagram illustrating the method of the present invention implemented between HLRs, including the step of placing a subsequent call to the device.

Once the call-back order has been confirmed, then the condition of the status flag 132 in the second HLR 450 is monitored until the called party B device 180 is registered, such that the call-back order can be executed. This process is illustrated in FIG. 5.

In this case, after the device 180 is turned on in step 200, or comes within range of the MSC 170, registration occurs in steps 210, 220, as described above. The second HLR 450 notes that the action flag 146 has been set to require notification of the first HLR 440 by the second HLR 450 (as indicated by the HLR reference field 149) when the condition of the status flag 132 indicates that the device 180 is registered in step 510. Subsequently, after a response to the REGISTRATIONNOTIFICATION message is received by the MSC 170 in step 520, an HLRACTION message is sent from the second HLR 450 to the first HLR 440 in step 530. This notifies the first HLR 440 that the presence of the device 180 has been detected, and that the device 180 is now available. The call-back order is then transferred to the first HLR 440 by setting the action flag 161 in the subscriber A mobile table 140 to require notification of the subscriber A by the second HLR 450 upon registration of the device 180 (as indicated by the reference to HLR2 in field 163). This occurs in step 535. Thereafter, the HLR 440 sends an hlraction response 250 to the HLR 450, which results in alerting the subscriber A to the availability of the subscriber B device 180 in steps 260, 270, as described above.

Assuming that subscriber A elects to implement a call-back order, the subscriber may enter a Feature Code in step 280, which is sent on to the GMSC 30, such that a FEATUREREQUEST message 540 goes out from the GMSC 30 to the second HLR 450 associated with the device 180. A ROUTINGREQUEST message is sent from the second HLR 450 to the MSC 170 in step 550, which results in paging the device 180 in step 310. After receiving a response to the page from the device 180 in step 320, the MSC 170 responds to the ROUTINGREQUEST message in step 560, which triggers a response to the FEATUREREQUEST message (sent in step 540) in step 570 back toward the GMSC 30. The second HLR 450 then sends an HLRACTION message to cancel the call-back order and clear the flags in fields 161–164 in the mobile table 140 for the calling party A in step 580, then the first HLR 440 sends an hlraction response in step 595 to the second HLR 450. Similarly, the second HLR 450 acts to cancel the call-back order and cross-references in fields 146–148 in the mobile table 145 for the subscriber B in step 600. After reception of the featurerequest response 570, call setup activity occurs in step 350 and the device 180 is alerted to placement of the subsequent call (the call-back) in step 380. Finally, a voice path is established between the subscriber A device 20 and the called party B device 180 in step 610.

Figure 6:
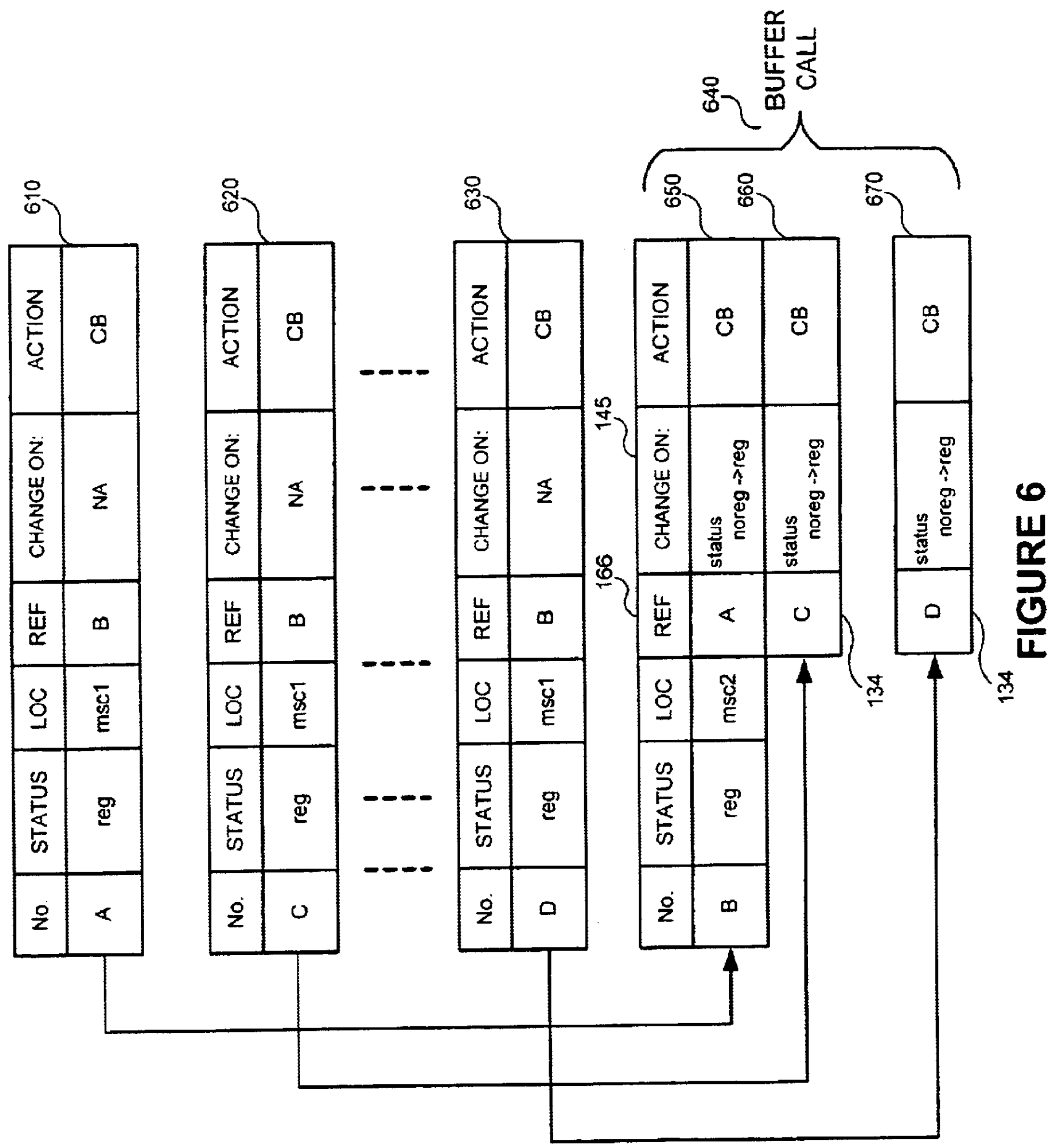
FIG. 6 illustrates the contents of tables in an HLR which may be used to implement multiple call-back orders using the method of the present invention.

FIG. 6 illustrates the possibility of multiple call-back orders placed for a single called party. In this case, multiple call-back orders, for example, call-back order "A" 610, call-back order "C" 620, and call-back order "D" 630, may all be placed by subscribers "A," "C" and "D" for the called party B. This results in updating the mobile table 145 for subscriber B to cross-reference the subscribers A, C, and D such that action flags are set to require notification of the individual subscribers when the condition of the status flag for the called party indicates that the device 180 is registered. The task queue 640, or call buffer 640, thus comprises an extension of the mobile table 145 for the called party B associated with the device 180 as shown in FIG. 6. Multiple entries in the call-back reference field 166 can thereby be accommodated. Upon registration of the device 180, the task queue 640 can be processed sequentially using either first-in, first-out (FIFO) or last-in, first-out (LIFO), procedures, as are well known to those skilled in the art.

Figure 7:
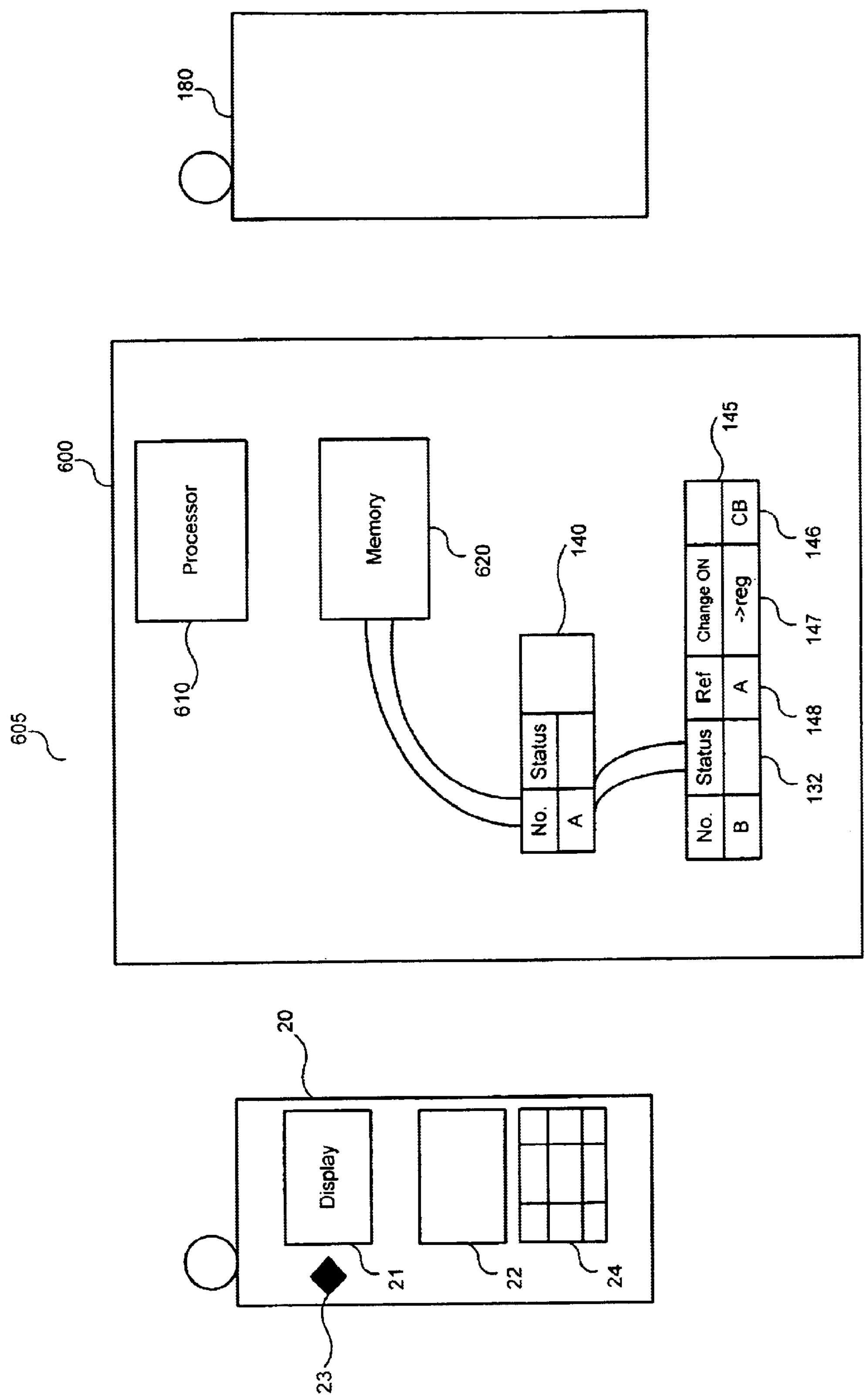
FIG. 7 illustrates an alternative embodiment of the present invention.

Turning now to FIG. 7, it can be seen that the invention also includes a system comprising a node 600 adapted to implement a call-back service by a subscriber attempting to call a telecommunications device 180 operated by a called party, wherein the node 600 includes a means for placing a call to the telecommunications device, which may comprise a processor 610 and memory 620 in conjunction with a mobile table 145 associated with the telecommunications device 180. The node 600 also includes a means for receiving an indication that the device 180 is not available, the means typically comprising a processor 610. Finally, the node 600 includes a means for receiving an order to place subsequent calls to the device 180 upon its registration, which may comprise memory tables 140 and 145 associated with the telecommunications device 180, including an action flags or fields 131–136 and 146–149.

In use, the processor 610 operates to monitor the condition of the status flag 132 in the table 145 described above, and to set an action flag 146 in the table 145 which requires notification of the subscriber (referenced in field 148) operating the telecommunications device 20 when the condition of the status flag 132 indicates that the device 180 is registered. Registration occurs according to when the timing flag 147 requires action (e.g., upon registration). The processor 610 operates to place the original call to the device 180, and to receive an indication that the device 180 is not available by way of the messaging operations illustrated in FIGS. 1–5.

Alternatively, the invention includes a network or system 605 adapted to implement the call-back service herein described. In this case, the means for placing a call to the telecommunications device 180 may comprise the node 600, in combination with the subscriber A-operated (calling party) telecommunications device 20. The means for receiving an indication that the device is not available typically resides in the node 600 (in the form of a processor 610), as described above, and the means for receiving an order to place a subsequent call to the device 180 also typically resides in the node 600 (e.g., memory tables 140 and 145), as described above. Again, the placement of the original call, receiving an indication that the device 180 is not available, and ordering a subsequent call to be placed to the device 180 upon registration typically occur according to the messaging scenarios illustrated in FIGS. 1–5.

Although the invention has been described with reference to specific embodiments, this description is not meant to be construed in a limited sense. The various modifications of the disclosed embodiments, as well as alternative embodiments of the invention, will become apparent to persons skilled in the art upon reference to the descriptions of the invention. It is, therefore, contemplated that the appended claims will cover such modifications that fall within the scope of the invention, or their equivalents.

What is claimed is:

1. A method of implementing a call-back service by a calling party attempting to call a telecommunications device, comprising the steps of:

determining that the telecommunications device is not available; and noting in a subscriber record for the telecommunications device that a subsequent call is to be placed to the telecommunications device upon its subsequent registration wherein said telecommunications device is associated with a Home Location Register (HLR) having the subscriber record, said subscriber record including an action flag and a status flag having a condition, wherein said noting step includes the steps of, setting the action flag to require notification of the calling party as to whether the call back should include if the condition of the status flag indicates that the telecommunications device is registered; and monitoring the condition of the status flag.

2. The method of claim 1, further including the steps of:

detecting that the telecommunications device has subsequently registered; and placing the subsequent call to the telecommunications device.

3. The method of claim 2, wherein the telecommunications device is associated with a Home Location Register (HLR) having the subscriber record, said subscriber record including a status flag having a condition, and wherein the step of detecting that the telecommunications device has subsequently registered includes the steps of:

receiving an indication at the HLR that the telecommunications device is registered; and changing the condition of the status flag to indicate that the telecommunications device is registered.

4. The method of claim 2, further including the steps of:

notifying the calling party subscriber that the device is available.

5. The method of claim 4, wherein the step of notifying the calling party that the telecommunications device is available includes the step of sending an announcement or a display message to the calling party indicating that the telecommunications device is available.

6. The method of claim 2 wherein the subsequent call is placed to the telecommunications device in response to dialing of the A-number associated with the telecommunications device by the calling party.

7. The method of claim 2 wherein the subsequent call is placed to the telecommunications device in response to entering of a preselected feature code by the calling party.

8. The method of claim 2 further comprising:

querying the calling party as to whether the subsequent call should be placed to the telecommunications device.

9. The method of claim 8, wherein the step of querying the calling party as to whether the subsequent call should be placed to the telecommunications device includes the step of sending a query announcement or a query display to the calling party.

10. The method of claim 2, wherein the step of placing the subsequent call to the telecommunications device includes sending a ROUTINGREQUEST message.

11. The method of claim 1 an indication to the calling party that the telecommunications device is not available.

12. The method of claim 1, wherein the indication is an announcement indicating that the telecommunications device is out of range, turned off or busy.

13. The method of claim 1 further comprising receiving an order to place a subsequent call to the telecommunications device upon its registration.

14. The method of claim 13, wherein the order is placed by entering a preselected feature code.

15. The method of claim 1, wherein the telecommunications device is associated with a second Home Location Register (HLR) having the subscriber record, said subscriber record including a HLR reference field which points to a first HLR associated with the calling party.

16. The method of claim 15, wherein the subscriber record further includes an action flag and a status flag having a condition, and further comprising the steps of:

setting the action flag to require notification of the first HLR by the second HLR if the condition of the status flag indicates that the telecommunications device is registered; and monitoring the condition of the status flag.

17. The method of claim 16, including the steps of:

notifying the first HLR that the device is registered.

18. A system for implementing a call-back service by a calling party attempting to call a called party telecommunications device, comprising:

a Home Location Register (HLR) associated with said called party telecommunications device for determining that the called party telecommunications device is not available, and noting in a calling party record referenced to the called party telecommunications device that a subsequent call to the called party telecommunications device is to be placed upon registration by the called party telecommunications device wherein said calling party record within said HLR including an action flag and a status flag having a condition, wherein said HLR further comprises, means for setting the action flag to require notification of the calling party as to whether the call back should be made if the condition of the status flag indicates that the called party telecommunications device is registered; and means for monitoring the condition of the status flap.

19. The system of claim 18, further comprising:

a calling party telecommunications device in electronic communication with the HLR for receiving an indication that the called party telecommunications device is not available and for placing a subsequent call to the called party telecommunications device after registration by the called party telecommunications device.

* * * * *